US012103759B2

(12) United States Patent
Murakami

(10) Patent No.: US 12,103,759 B2
(45) Date of Patent: Oct. 1, 2024

(54) REMOTE OPERATION SPRAY DEVICE

(71) Applicant: DRONE NET CO., LTD., Tokyo (JP)

(72) Inventor: Kazuyuki Murakami, Tokyo (JP)

(73) Assignee: DRONE NET CO., LTD., Tokyo (JP)

( * ) Notice: Subject to any disclaimer, the term of this patent is extended or adjusted under 35 U.S.C. 154(b) by 868 days.

(21) Appl. No.: 16/959,971

(22) PCT Filed: Jan. 15, 2018

(86) PCT No.: PCT/JP2018/000853
§ 371 (c)(1),
(2) Date: Jul. 2, 2020

(87) PCT Pub. No.: WO2019/138576
PCT Pub. Date: Jul. 18, 2019

(65) Prior Publication Data
US 2021/0061543 A1    Mar. 4, 2021

(51) Int. Cl.
*B65D 83/16* (2006.01)
*B64C 39/02* (2023.01)
(Continued)

(52) U.S. Cl.
CPC ............ *B65D 83/16* (2013.01); *B64C 39/024* (2013.01); *B64D 1/18* (2013.01); *B65D 83/753* (2013.01); *B64U 2101/00* (2023.01)

(58) Field of Classification Search
CPC ......... B05B 9/007; B05B 9/06; B05B 13/005; B05B 12/00; B64D 1/18; B64D 1/16;
(Continued)

(56) References Cited

U.S. PATENT DOCUMENTS

| 10,155,587 | B1 * | 12/2018 | Tang ................ B64C 27/08 |
| 11,420,744 | B2 * | 8/2022 | Van Der Steur ...... B05B 12/122 |
| 2014/0303814 | A1 * | 10/2014 | Burema ............... A01C 21/00 |
| | | | 901/1 |

FOREIGN PATENT DOCUMENTS

| FR | 2800302 A1 * | 5/2001 | ............ B65D 83/26 |
| JP | 40-019133 B1 | 8/1965 | |

(Continued)

OTHER PUBLICATIONS

Screen captures from YouTube video clip entitled "Drone Spray Hornet V1" uploaded on Jan. 20, 2016 by user "Drone Volt" retrieved from internet <https://youtu.be/eAtwnfOz68o> (Year: 2016).*

*Primary Examiner* — Tuongminh N Pham
*Assistant Examiner* — Juan C Barrera
(74) *Attorney, Agent, or Firm* — H&I PARTNERS; Chai Im; C. Andrew Im

(57) ABSTRACT

A remote operation spray device configured to depress-operate a spray nozzle of a spray device from a remote location. Device generates adequate pushing force required for depression and, by achieving weight reduction of the device proper, enables easy mounting on an aerial vehicle or other mobile unit. Device includes a main body fixedly attached to a mobile unit, a holder fixedly retaining a spray cartridge and a spray mechanism for jetting spray. The spray mechanism includes a base member, a depressing member pivotably attached to the base member for pressing down a spray nozzle, a pushed member provided at a distal end of the depressing member, and a pusher installed on the base member for pushing the pushed member to move horizontally. The horizontal pushing action of the pusher pushes and moves the pushed member to pivot the depressing member and press the spray nozzle vertically downward.

4 Claims, 3 Drawing Sheets

(51) Int. Cl.
  *B64D 1/18* (2006.01)
  *B65D 83/14* (2006.01)
  *B64U 101/00* (2023.01)
(58) Field of Classification Search
  CPC .......... B65D 83/14–759; B64C 39/024; B64C 39/02; B64U 2101/00; A01C 21/00
  USPC ........................................................ 239/171
  See application file for complete search history.

(56) References Cited

FOREIGN PATENT DOCUMENTS

| | | |
|---|---|---|
| JP | S54-83741 U | 6/1979 |
| JP | S58-003960 U1 | 1/1983 |
| JP | 02-274696 A | 11/1990 |
| JP | 08-163946 A | 6/1996 |
| JP | 2004-078345 A | 3/2004 |
| JP | 2008-155991 A | 7/2008 |
| JP | 2016-127808 A | 7/2016 |
| KR | 20200008192 * | 7/2018 |

* cited by examiner

REMOTE OPERATION SPRAY DEVICE

RELATED APPLICATION

This application is a § 371 application of PCT/JP2018/000853 filed Jan. 15, 2018, which is incorporated herein by reference in its entirety.

TECHNICAL FIELD present invention relates to a spray device responsive to an operation instruction from a remote location for pushing down a spray nozzle of a sprayer used for marking, insecticide spraying, agricultural chemical spraying, cleanser application, or the like, particularly to a remote operation spray device capable of easily achieving required pressing force with a simple structure and amenable to mounting on an aerial vehicle or the like by dint of light weight of the device proper.

BACKGROUND OF THE INVENTION

Technologies have been developed for jetting spray from a spray can or the like by remote operation. Owing to the need for a certain degree of pressing force for pressing down the spray nozzle of a spray can, a particularly large number of technologies have been developed for readily producing such force even by operation from a remote location.

For example, JP2016-127808A discloses a long handle for remote spray operation that accurately maintains deviation-free positional relationship between a spray can nozzle button and a pusher during operation, which long handle is attached to the spray can in a double-pipe structure comprising an outer pipe and an inner pipe longer than the outer pipe and provided in part of its lengthwise direction with a turn stopper, the configuration being such that when the outer pipe and inner pipe are grasped by opposite hands, opening and closing of the spray nozzle button is performed by sliding operation of the inner pipe in longitudinal direction.

Although this technology does indeed enable the spray can nozzle button to be accurately pressed down by remote operation, it has a problem of being structurally inadequate from the viewpoint of obtaining sufficient pressing force for depressing the nozzle button. Moreover, since remote operation is limited to length of the handle, the technology also has the intolerable issue of not allowing easy depression of the spray can nozzle button from a distant location.

Further, JP2008-155991A teaches a technology related to a remote spray operation rod adapted to enable spraying by spray cans of a number of different types of sprayers, whose structure comprises a push arm compatible with different sprayers attached to a remote support rod.

Although this technology enables spray operation of any type of spray to be performed by remote operation, it has a drawback similar to that mentioned above in that it cannot achieve sufficient pressing force for depressing the nozzle button and in that it does not allow easy depression of the spray can nozzle button from a location more distant than the length of the rod.

In addition, JP2004-078345A discloses a technology related an anti-crime sprayer for spraying a criminal with a coloring agent from a distance, which comprises a fix-mounted main body, a spray can fitted inside the main body and a through-hole formed in the main body, and is adapted to jet coloring agent from the main body when a solenoid for opening a spray can ejection port is remotely operated to spray the coloring agent.

Although this technology is capable of jet-spraying by remote operation, it is of limited usefulness because the spray is fixed at a set location. And while force for depressing the spray nozzle can be obtained, large pressing force cannot be obtained using minimal force, so that the technology is inadequate for achieving sufficient depression force.

In light of the foregoing, a need has been felt for development of a remote operation spray device capable of spraying at a desired location using a spray can mounted on a movement-capable mobile unit, of producing sufficient force for depressing a spray nozzle, and of achieving light weight suitable for mounting on mobile units of various types including aerial vehicles.

Patent Document 1: JP2016-127808A
Patent Document 2: JP2008-155991A
Patent Document 3: JP2004-078345A

OBJECT AND SUMMARY OF THE INVENTION

Problem to be Overcome by the Invention

An object of the present invention is to overcome the aforesaid issues by providing a remote operation spray device that is adapted to depress a spray nozzle of a sprayer used for marking, insecticide spraying, agricultural chemical spraying, cleanser application or the like by applying adequate pressing force in response to operation from a remote location, particularly to a remote operation spray device capable of easily producing adequate pressing force required for depression with a simple structure and amenable to easy mounting on an aerial vehicle or the like by dint of light weight of the device proper.

Means for Solving the Problem

The present invention remote operation spray device directed to achieving the aforesaid object is configured as a remote operation spray device mounted on a wiredly or wirelessly controlled mobile unit and comprises a spray device main body fixedly attached to the mobile unit and loaded with a spray cartridge, a holder for fixedly retaining the spray cartridge and a spray mechanism mounted on top of the spray device main body for jetting spray from the loaded spray cartridge, wherein the spray mechanism comprises a base protruding from the spray device main body to form a substructure of the spray mechanism, a depressing member pivotably attached to the base member for pressing down a spray nozzle of the spray cartridge, a pushed member provided at a distal end section of the depressing member and a pusher installed on the base member for pushing the pushed member to move horizontally, by which configuration horizontal pushing action of the pusher pushes and moves the pushed member to thereby pivot the depressing member and press the spray nozzle vertically downward.

Further, the pusher comprises a solenoid connected to an electrical power source, a push-pin pushed horizontally outward upon application of voltage to the solenoid and a release spring for retracting the pushed-out push-pin in opposite direction, wherein a configuration is adopted that performs application/release of horizontal pushing movement toward the pushed member by applying or not applying voltage to the solenoid so as to extend the push-pin or as to retract the push-pin by the release spring.

Further, a configuration is adopted whereby the pushed member is installed at the distal end section to have an inclination angle of 45° with respect to the depressing member.

Moreover, a configuration is adopted whereby the remote operation spray device comprises a control unit capable of remote operation for controlling pushing action of the pusher of the spray mechanism by wire or wirelessly.

Further, the spray cartridge is configured as one for a single or multiple spray types selected from among a group including ones for marking, insecticide spraying, agricultural chemical spraying and cleanser application.

In addition, the mobile unit is configured as an aerial vehicle capable of gliding flight.

Effects of the Invention

Since the remote operation spray device according to the present invention is configured as described above, it achieves effects such as the following:
1. Since a configuration is adopted that loads spray into an operationally controllable mobile unit, spraying work can be performed at remote locations. Further, since a spray mechanism is provided by which horizontal pushing force applied to the pressed member by the pusher is converted to downward force applied to the depressing member, force adequate for pressing down the spray nozzle can be obtained even if the motive power is relatively weak.
2. Since the pusher is structured to generate pushing force of the push-pin using force of the excited solenoid, weight of the mechanism for generating motive power can be minimized, thereby enabling installation of the spray device on an aerial vehicle.
3. Since a configurations is adopted that angles the pressed member at an inclination angle of 45 degrees with respect to the distal end section of the depressing member, horizontal pushing force can be efficiently converted to downward force.
4. As the control unit is provided for wiredly or wirelessly controlling pushing action of the pusher, behavior of the spray mechanism can be controlled from a remote location.
5. Since spray selection from among, inter alia, sprays for marking, insecticide spraying, agricultural chemical spraying and cleanser application is made possible, remote operation of spraying matched to various purposes is possible.
6. Since an aerial vehicle is adopted as the mobile unit, spraying work can be performed at high places.

DETAILED DESCRIPTION OF THE EMBODIMENTS OF THE INVENTION

Figure 1:
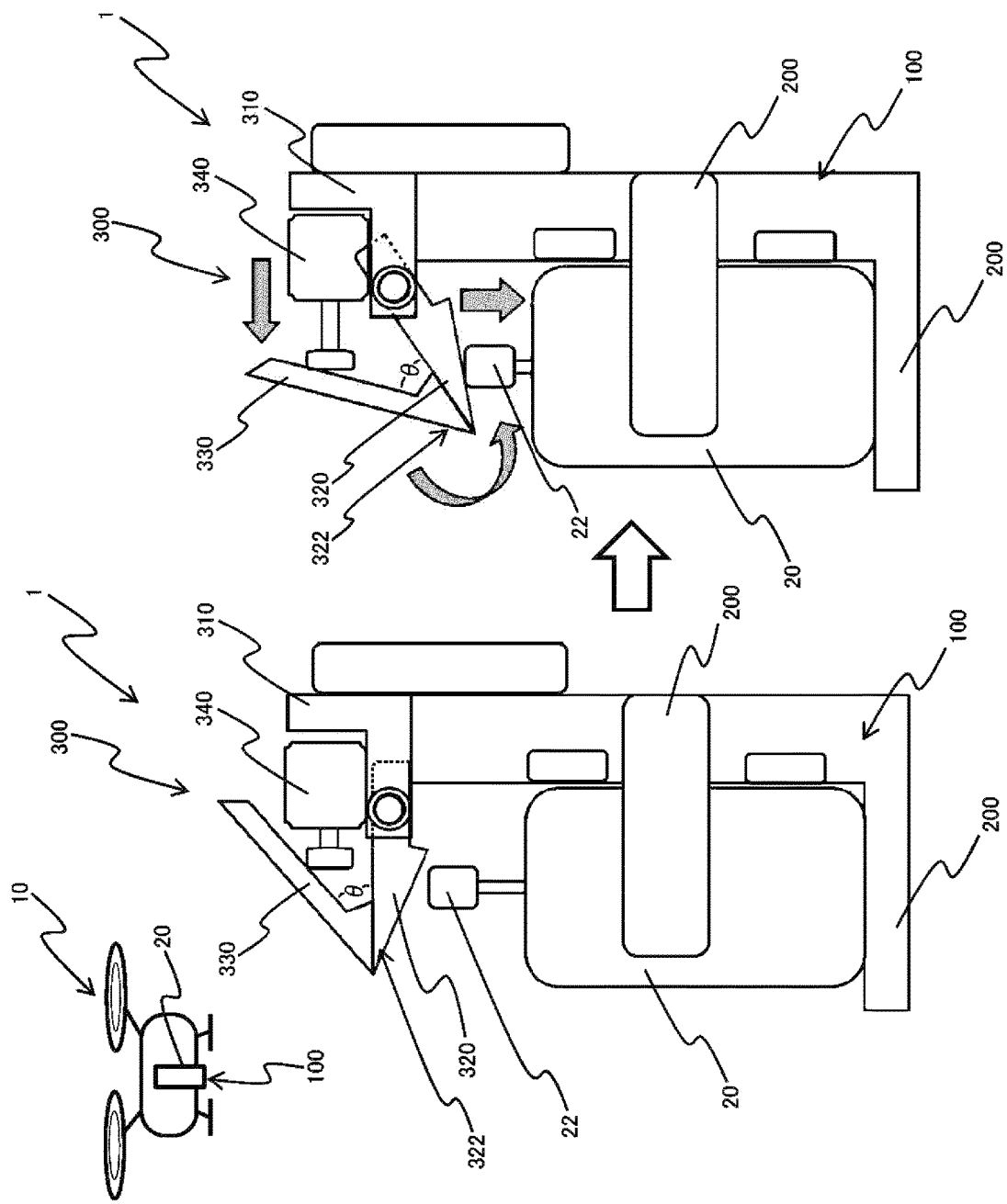
FIG. 1 is a side view of a remote operation spray device according to the present invention.

There now follows a detailed explanation of the remote operation spray device according to the present invention based on an embodiment shown in the drawings.

Figure 2:
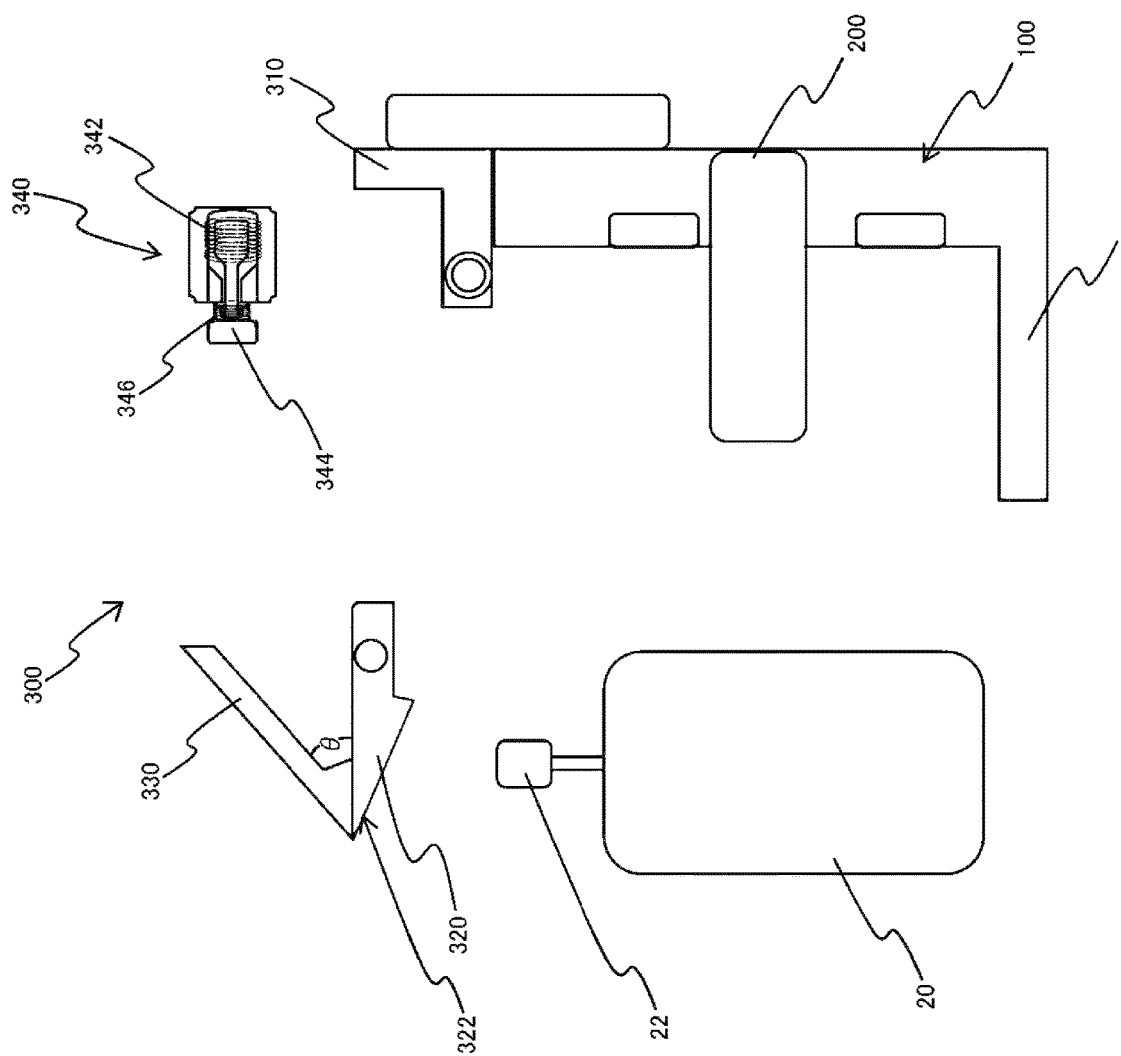
FIG. 2 is an exploded side view of the remote operation spray device.
Figure 3:
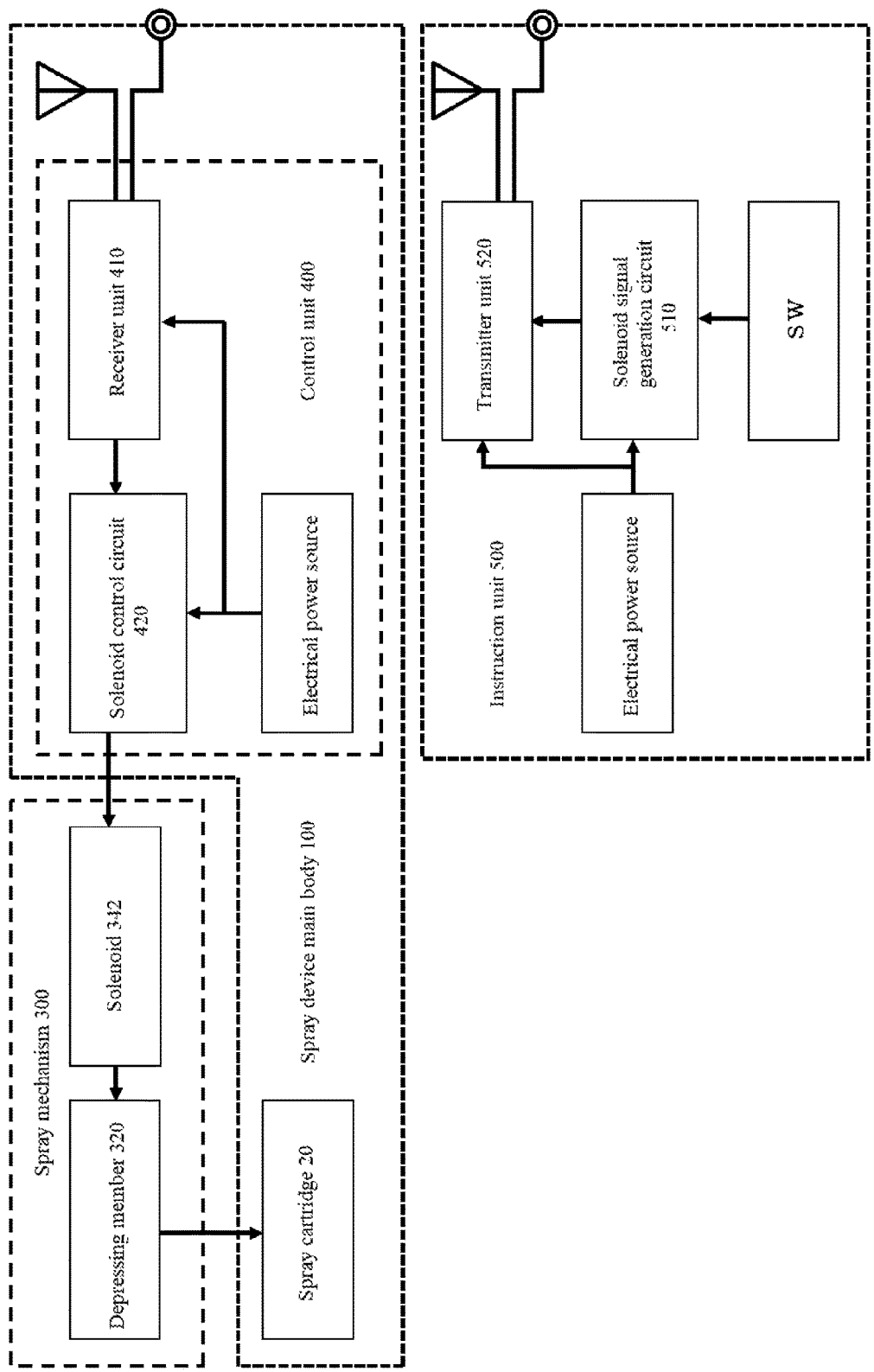
FIG. 3 is a block diagram showing processing performed by a control unit.

FIG. 1 is a side view of a remote operation spray device according to the present invention and FIG. 2 is an exploded side view of the remote operation spray device. FIG. 3 is a block diagram showing processing performed by a control unit.

A remote operation spray device 1 according to the present invention comprises a spray device main body 100, a holder 200, a spray mechanism 300 and a control unit 400, and upon being loaded with a spray cartridge 20, is mounted on a mobile unit 10 as a device for jetting spray from the spray cartridge 20 to perform spraying by remotely controlling the spray mechanism 300.

In the present embodiment, the mobile unit 10 mounted with the remote operation spray device 1 is configured to operate via wire or wireless connection from a location distant from the mobile unit 10. Alternatively, the mobile unit 10 can be equipped with autopilot means (not shown) comprising memory means and a processing unit for reading a program stored in the memory means and controlling propulsion means of the mobile unit, thereby enabling automatic movement along a route programed in advance.

The spray cartridge 20 is a device that uses high-pressure gas or the like to jet atomized liquid, namely, one that uses gas pressure to jet liquid contained in an interior space of the cylindrical main body from a nozzle installed in the main body. A structure is adopted whereby depression of a button installed in a can-shaped top of the main body causes jetting of spray from a nozzle provided near the button. In the present embodiment, sprays selected as desired from among ones for marking, insecticide spraying, agricultural chemical spraying, cleanser application and the like can be loaded for use, and while a liquid consisting of paint, insecticide, cleanser or the like is charged into the interior of the cylindrical main body, sprays are not limited to these and use of any of various other sprays is also possible.

As shown in FIGS. 1 and 2, the spray device main body 100 loaded with and retaining the spray cartridge 20 is a body serving as a substructure for fixed connection to the mobile unit 10. Although the spray device main body 100 is made of plastic or other resin material in the interest of weight minimization in the present embodiment, it is not limited to such a material and can instead use another kind of suitably selected light-weight material.

The holder 200, which is a structural member for fixedly retaining the spray cartridge 20, extends from the spray device main body 100 to detachably retain the spray cartridge 20 from the left, right and underneath. The spray cartridge 20 can therefore be loaded in the mobile unit 10 in stably retained condition.

The spray mechanism 300, which is fix-mounted on the spray device main body 100 via the holder 200, is configured to jet spray by pressing down a spray nozzle 22 of the spray cartridge 20 and, as shown in FIGS. 1 and 2, is installed on top of the spray device main body 100.

As shown in FIGS. 1 and 2, in the present embodiment the spray mechanism 300 comprises a base member 310, a depressing member 320, a pushed member 330 and a pusher 340. The base member 310, which is a plate-like structural member serving as a substructure of the spray mechanism 300, is fixedly mounted on top of the spray device main body 100 to protrude horizontally forward direction of the spray device main body 100. The base member 310 is preferably made of a light-weight material in order to minimize weight. Moreover, since it serves as a substructure of the spray mechanism 300, it is preferably made of a strong material.

As shown in FIGS. 1 and 2, the depressing member 320, which is a member for pressing down the spray nozzle 22 of the spray cartridge 20, is structured to be pivotably attached to the base member 310 in state almost in contact with the spray nozzle 22. The base member 310 protrudes horizontally forward and the depressing member 320 is pivotably attached to a tip portion of the base member 310.

The pushed member 330, which is a structural member for receiving horizontal pushing force of a pusher 340 described below, is fix-mounted on a distal end section 322 of the depressing member 320. Since the pushed member 330 is mounted on the distal end section 322 of the depressing member 320 pivotably attached to the base member 310 in the present embodiment, it pivots together with the depressing member 320.

The pusher 340, which is a structural member for pushing the pushed member 330 to move in horizontal direction, is fixedly mounted on the base member 310 to enable pushing toward the pushed member 330, as shown in FIGS. 1 and 2.

The pusher 340 is fixed on the base member 310 so as to perform horizontal pushing action that causes the pushed member 330 to receive horizontal pushing force. As the pushed member 330 is installed on the depressing member 320 pivotably attached to the base member 310, horizontal pushing force against the pushed member 330 is converted to downward force by pivoting of the depressing member 320. Namely, pushed movement of the pushed member 330 by horizontal pushing action from the pusher 340 pivotably rotates the depressing member 320. As a result of this configuration, the depressing member 320 acts to push the spray nozzle 22 vertically downward and thereby jet spray.

As this structure utilizes the principle of the lever to convert back-and-forth motion to up-and-down motion, the configuration is capable of ensuring adequate depressing force.

By adopting this structure, the pusher 340 can depress the spray nozzle 22 with greater force than when depressing it directly, so that depressing force required for pushing down the spray nozzle can be obtained even in the case of using a small, weak pusher 340, whereby weight of the spray device main body 100 can be minimized to a degree making it amenable for installation on an aerial vehicle or the like.

In the present embodiment, the pusher 340 is of a structure utilizing a solenoid mechanism. More specifically, as shown in FIG. 2, the pusher 340 comprises a solenoid 342, a push-pin 344 and a release spring 346.

The solenoid 342 is a coil of copper wire that is connected to an electrical power source and generates a magnetic field when energized by electric current. Further, the push-pin 344 is a member pushed horizontally outward upon application of voltage to the solenoid 342. In the configuration according to the present embodiment, the push-pin 344 has a movable iron core of magnetic material and the movable iron core is attracted to an internally provided fixed iron core magnetized by magnetism generated by electric current passing through the solenoid 342, whereby the push-pin 344 is pushed outward in such direction.

The release spring 346 is a spring member that biases the pushed-state push-pin 344 to retract it from the extended state when current supply to the solenoid 342 is cut off.

In the present embodiment, the pusher 340 is configured to perform application/release of horizontal pushing movement toward the pushed member 330 by applying or not applying voltage to the solenoid 342 so as to extend the push-pin 344 or as to retract the push-pin 344 by the release spring 346. This configuration generates motive power adequate for depressing the spray nozzle 22 of the spray cartridge 20 and enables a structure that minimizes mechanism weight.

As shown in FIGS. 1 and 2, in the configuration according to the present invention, the pushed member 330 is installed at the distal end section 322 to have an inclination angle θ of 45° with respect to the depressing member 320. This configuration ensures that horizontal pushing force against the pushed member 330 is reliably and efficiently converted to downward force. Although the inclination angle θ is defined as 45° in the present embodiment, it is not limited to this and the inclination angle can be appropriately adjusted in accordance with downward stroke of the depressing member 320.

In the present embodiment, as shown in FIG. 3, the remote operation spray device 1 is configured to comprise the control unit 400 for controlling pushing action of the pusher 340 of the spray mechanism 300. The control unit 400 comprises a receiver unit 410 for receiving instruction signals transmitted from an instruction unit 500 provided outside the remote operation spray device 1 and a solenoid control circuit 420 for analyzing received instruction signals and outputting instructions to the pusher 340, and is capable of remote control by wire or wirelessly. The instruction unit 500 comprises a solenoid signal generation circuit 510 for outputting solenoid ON/OFF switching signals in response to user operation instructions or programmed instructions and a transmitter unit 520 for transmitting said signals to the control unit 400. This configuration enables behavior of the spray mechanism to be controlled from a remote location.

In the present embodiment, the mobile unit 10 is configured as an aerial vehicle capable of gliding flight. As this configuration enables spraying work to be performed at, for example, high places and similar, and even at considerably distant locations, it can be used for various purposes.

EXPLANATION OF SYMBOLS

1 Remote operation spray device
10 Mobile unit
20 Spray cartridge
22 Spray nozzle
100 Spray device main body
200 Holder
300 Spray mechanism
310 Base member
320 Depressing member
322 End section
330 Pushed member
340 Pusher
342 Solenoid
344 Push-pin
346 Release spring
400 Control unit
410 Receiver unit
420 Solenoid control circuit
500 Instruction unit
510 Solenoid signal generation circuit
520 Transmitter unit
θ Inclination angle

The invention claimed is:

1. A mobile unit comprising a remote operation spray device mounted on the mobile unit to be remotely controllable by wire or wirelessly, comprising:
   a spray device main body fixedly attached to the mobile unit and loaded with a spray cartridge;
   a holder to fixedly retain the spray cartridge; and
   a spray mechanism mounted on top of the spray device main body to jet spray from the spray cartridge;
   wherein the spray mechanism comprises:

a base member protruding from the spray device main body to form a substructure of the spray mechanism, the base member is fixedly mounted on top of the spray device main body to protrude horizontally in a forward direction of the spray device main body;

a depressing member pivotably attached to a tip portion of the base member to press down a spray nozzle of the spray cartridge, the depressing member being moveable between a non-contact position and a contact position with respect to the spray nozzle;

a pushed member mounted on a distal end section of the depressing member with an inclination angle of 45° with respect to the depressing member, to pivot together with the depressing member to maintain the inclination angle of 45° in both the non-contact position and the contact position; and a pusher fixedly mounted on the base member to move towards the pushed member and to push the pushed member to move horizontally;

wherein the pusher comprises a solenoid connected to an electrical power source, a push-pin pushed horizontally outward upon application of a voltage to the solenoid and a release spring configured to retract the pushed-out push-pin in an opposite direction; wherein a horizontal pushing movement toward the pushed member is applied and released by applying the voltage to the solenoid to extend the push-pin and by not applying the voltage to the solenoid to retract the push-pin by the release spring, wherein the release spring is horizontal and aligned with the push-pin; and wherein the horizontal pushing action of the pusher pushes and moves the pushed member to pivot the depressing member from the non-contact position to the contact position, to press the spray nozzle vertically downward.

2. The mobile unit of claim 1, wherein the remote operation spray device further comprises a control unit configured to remotely control the horizontal pushing action of the pusher of the spray mechanism by wire or wirelessly.

3. The mobile unit of claim 1, wherein the spray cartridge comprises a single or multiple spray types selected from among a group including ones for marking, insecticide spraying, agricultural chemical spraying and cleanser application.

4. The mobile unit of claim 1, wherein the mobile unit is an aerial vehicle capable of a gliding flight.

\* \* \* \* \*